United States Patent [19]

Lane et al.

[11] Patent Number: 4,692,682
[45] Date of Patent: Sep. 8, 1987

[54] NICAD BATTERY CHARGER

[75] Inventors: Kerry S. Lane, Newmarket; Derek V. Moore, Rexdale, both of Canada

[73] Assignee: Levitt Safety Limited, Canada

[21] Appl. No.: 812,633

[22] Filed: Dec. 23, 1985

[51] Int. Cl.$^4$ .............................................. H02J 7/04
[52] U.S. Cl. ...................................... 320/35; 320/22; 320/31; 320/39
[58] Field of Search .................... 320/22, 23, 24, 31, 320/32, 35, 39

[56] References Cited

U.S. PATENT DOCUMENTS

| | | | |
|---|---|---|---|
| 3,614,584 | 10/1971 | Burkett et al. | 320/35 |
| 3,626,270 | 12/1971 | Burkett et al. | 320/35 |
| 3,795,818 | 3/1974 | Beaman et al. | 320/39 |
| 3,514,687 | 5/1970 | Hunter et al. | 320/15 |
| 3,852,652 | 12/1974 | Jasinski | 320/35 |
| 3,855,516 | 12/1974 | Fairchild | 320/22 |
| 3,959,707 | 5/1976 | Stephens | 320/22 |
| 4,061,956 | 12/1977 | Brown et al. | 320/22 |
| 4,065,712 | 12/1977 | Godard et al. | 320/39 |
| 4,394,612 | 7/1983 | Emerle et al. | 320/31 |

Primary Examiner—Peter S. Wong
Assistant Examiner—Anita M. Ault
Attorney, Agent, or Firm—Finnegan, Henderson, Farabow, Garrett & Dunner

FOREIGN PATENT DOCUMENTS

| | | |
|---|---|---|
| 2,326,052 | 4/1977 | France . |
| 2,553,894 | 4/1985 | France . |
| 2,120,472 | 11/1983 | U.K. . |
| 2,039,427 | 8/1980 | U.K. . |
| 0,056,471 | 12/1981 | E.P. . |
| 0,005,841 | 12/1979 | E.P. . |

[57] ABSTRACT

An electronic battery charger for charging various types of dry cells including nickel-cadmium batteries provides for a cool down phase during battery charging cycle once a maximum predetermined temperature or voltage for the battery has been sensed. Subsequent to the cool down phase, a charging current is controlled in a manner such that, as battery temperature continues to decrease, a control device increases the charging current applied to the battery. Once a reheating of the battery is detected, the control device decreases the charging current. In this manner, a maximum charge is achieved in the battery at a temperature close to the ambient temperature.

40 Claims, 3 Drawing Figures

NICAD BATTERY CHARGER

FIELD OF THE INVENTION

This invention relates to battery chargers for dry cell batteries and more particularly, to chargers which are used in the fast charging of batteries prone to over-heating.

BACKGROUND OF THE INVENTION

Rechargeable dry cell batteries are widely used as reliable sources of power to provide for portability of electrical tools, lighting equipment, electronic computer games and toys and the like. With the use of rechargeable batteries having extra long life, the costs of a rechargeable system are considerably less than using replaceable batteries when they become discharged. In many situations, there is little if any constraint with respect to the amount of time which may be allotted to recharging the smaller variety rechargeable dry cell batteries, particularly of the nickel cadmium type. Hence, heat generated during the charge cycle of the battery can be dissipated without seriously overheating and affecting the recharged battery's performance. However, there are circumstances where it is desirable to recharge the batteries as quickly as possible. Particularly with larger rechargeable batteries, this can result in the generation of excessive amounts of heat as the battery begins to reject portions of the charging current applied to the battery as it gets closer and closer to its maximum charge.

Heat generation particularly becomes a problem when the battery cells are enclosed in a sealed casing or the like which cannot readily dissipate the heat generated during the charging. In addition, heat generation in circumstances where a fast charge is require is a problem with large amp-hour rated batteries of the nickel cadmium type. In addition, electronic components, which may be used in the controlling of the recharging of such batteries, also generate heat which may not be readily dissipated during the charging cycle. All of these aspects then lend to heat generation either within the battery or in its immediate surroundings which can appreciably affect the maximum level of charge which can be placed on the battery. In accordance with recent studies, it has been determined that a battery, which appears to be fully charged at a temperature of 40° C., is effectively only 80 percent charged when it cools down to room temperature for use. There have, therefore, been many attempts to control charging current during the battery charging cycle in a way which does not appreciably overheat the batteries. In many instances where time is not of the essence, slow charging phases can be adopted to preclude overheating of the battery during the final phases of battery charging. U.S. Pat. No. 3,626,270 discloses the use of charge/discharge cycles in the recharging of a battery. This approach provides for a rapid charging of rechargeable dry cell batteries. During charging intervals, charge current pulses are applied to the battery and subsequently by use of alternating current voltage, a charge/discharge current is applied to the battery. The system charging may be terminated upon sensing a maximum temperature for the battery and then switching to a trickle charge to maintain the battery charge.

U.S. Pat. No. 4,394,612 contemplates fast charging circuits and has the capability of charging batteries at a charging current of four times the "C" rating of the battery. Provision is made for sensing the transformer temperature. Upon attaining a predetermined temperature, fast charging of the batteries is terminated and interval trickle charge is applied to maintain the charge on the battery. In each of these situations, it is assumed that once the battery has attained a predetermined temperature or voltage regardless of the temperature, it is assumed that the battery is fully charged and hence is switched to trickle charging. However, it has been discovered that when the battery cools its extent of charge may be reduced by as much as twenty percent, compared to its apparent charge level when the battery is overheated.

U.S. Pat. No. 3,614,584 discloses pulse charging of rechargeable dry cell batteries. During the high rate of charge, current pulses are applied through a rectifying device for the AC charging current. Control is provided to reduce current flowing through the rectifying device as a selected terminal characteristic of the battery, such as voltage or temperature increases as charge progresses and stopping all current flow after attainment of either the sensed terminal battery voltage or terminal temperature. A silicon controlled rectifier is used in rectifying the AC charging current. A regenerative effect then takes place, due to the decreasing current causing the SCR to fire later in each cycle because of decreased gate sensitivity. A thermistor is used to sense battery temperature. A decrease in thermistor resistance, due to battery temperature increase, causes the SCR to fire later in each cycle. As a consequence, a point is reached where the SCR will no longer turn on and charging of the battery is terminated. When the battery voltage falls after termination of charge, the SCR will commence conducting on an infrequent basis to apply a trickle charge to the battery. Therefore, this device compensates for increased battery temperature and provides some cooling for the battery during the final stages of charging. However, the battery does not effectively cool during the latter stages of the charging, because charging current is maintained on the battery, albeit reduced, but still sufficient to cause heating of the battery due to tne battery's rejection of at least a portion of the charging current applied. It is, therefore, very difficult to achieve a reduced battery temperature during the final stages of charging, so that when the battery is removed from the charger and then is allowed to cool to ambient, the maximum possible charge is not provided in the battery.

SUMMARY OF THE INVENTION

According to an aspect of the invention, a method of charging a battery pack made up of one or more rechargeable cells comprises applying a charging current to the battery pack and measuring a characteristic of the battery pack, such as temperature, voltage or a combination thereof during the charging phase; reducing charging current when a predetermined value for the battery characteristic is sensed to permit the battery pack to cool for a period to a lower temperature; resuming charging of the battery pack when the battery pack has cooled during the period to the lower temperature and selecting effective magnitude of charging current to prevent subsequent significant increase of battery pack temperature.

According to another aspect of the invention, an electronic battery charger for charging a rechargeable battery comprises means for sensing a battery characteristic, such as temperature, voltage or a combination thereof during a battery charging cycle. Means for charging a battery applies a charging current to such battery. Means for controlling charging current applied by the charging means is provided. The control means reduces charging current in response to the sensing means sensing a predetermined value for the sensed battery characteristic during a charging cycle to permit battery cooling for a period to a lower battery temperature. The control means activates the charging means for a second stage of battery charging when the battery has cooled during the period to the lower battery temperature. The control means selects effective magnitude of charging current to prevent subsequent significant increase of battery temperature during the second stage of battery charging.

BRIEF DESCRIPTION OF THE DRAWINGS

Preferred embodiments of the invention are discussed with respect to the electronic circuit shown in the drawings, wherein.

DETAILED DESCRIPTION OF THE PREFERRED EMBODIMENTS

It is appreciated that the method and apparatus, according to this invention, for recharging rechargeable batteries can be applied to a variety of configurations for dry and wet cells and may be used with many types of rechargeable dry cells including the very popular nickel cadmium cell. Often the cells are used in the form of a battery pack where two or more cells, normally connected in series, are enclosed within the battery pack. It is appreciated, however, that the system, according to this invention, may be used to charge individual cells. In systems which involve battery packs, often external of the case which contains the batteries, two or more terminals are provided for purposes of providing an electrical connection between the device for applying the charging current and the battery terminals of the pack. Three terminal constructions for battery packs are exemplified in U.S. Pat. Nos. 3,531,706; 4,240,022 and 4,394,612. According to applicant's co-pending U.S. patent application Ser. No. 06/729,156, filed Apr. 30, 1985, a two terminal battery pack is disclosed and a charging system therefor which is capable of charging the battery pack while at the same time measuring battery temperature and voltage through the two terminal construction.

Figure 1:
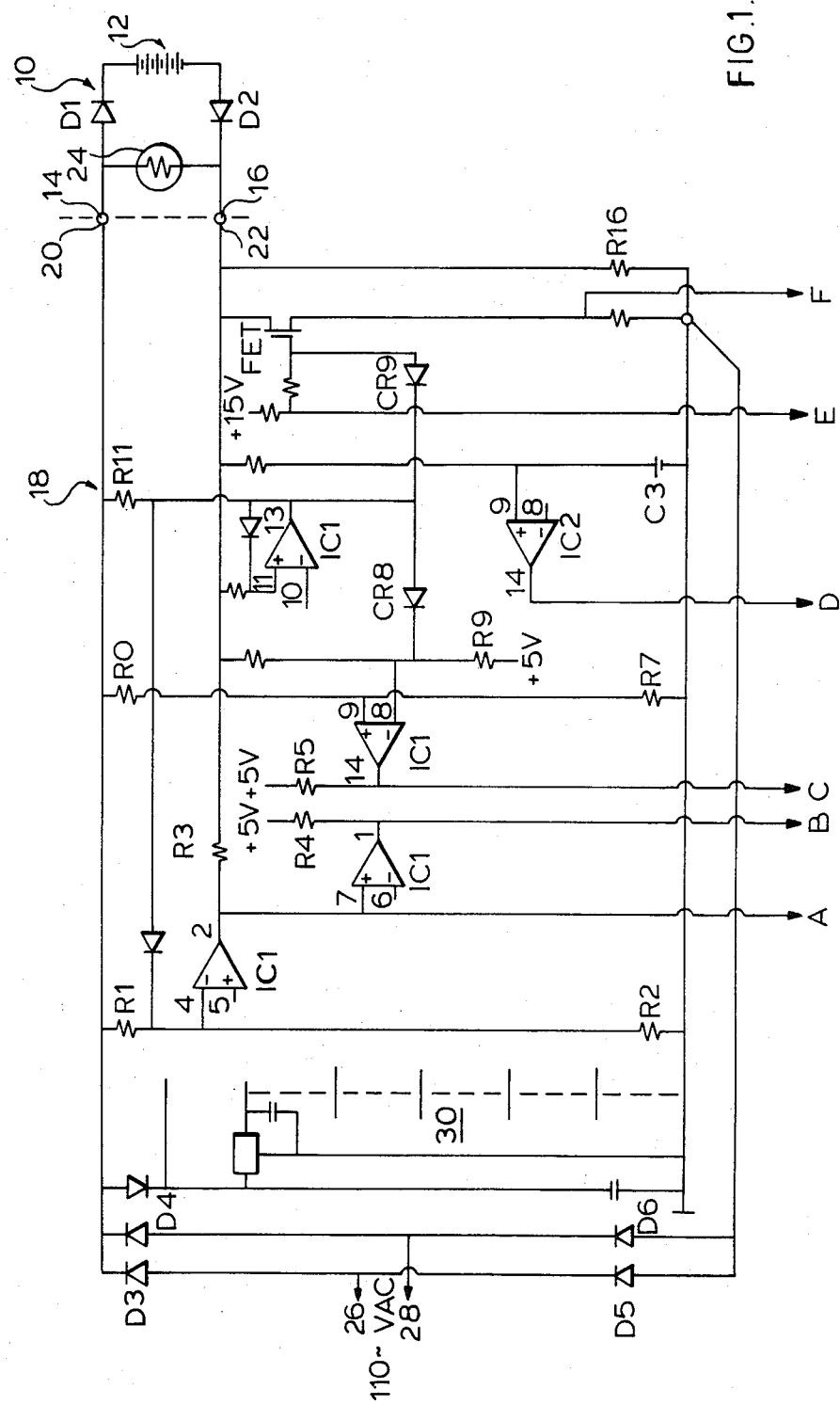
FIGS. 1, 2 and 3 are circuit drawings showing a preferred electronic circuit for charging dry cell batteries.

According to the embodiment of FIG. 1, a two terminal battery pack 10 comprises a plurality of serially connected batteries 12 provided in a case (not shown). Externally of the case are two terminals 14 and 16. The charging device 18 consists of mating terminal portions 20 and 22 which are interconnected to the battery pack 10 when charging of the battery pack is desired. Internally of the battery pack 10 is a thermistor 24 connected in parallel with the battery 12 and proximate thereto to provide in combination with the circuitry of the charging device 18 a means for measuring battery temperature. Diodes D1 and D2 are provided within the battery pack which prevent current being delivered from the battery to the charging terminals but, as will be explained later with respect to the circuitry of device 18, do not prevent it being possible to measure the voltage of the battery pack 12.

A standard alternating current is applied to the integrated circuit 18 via terminals 26 and 28. Diodes D3, D4, D5 and D6 rectify the alternating current to provide a rectified output at terminals 20 and 22 which is input via terminals 14 and 16 to the battery pack 10. It will be appreciated with respect to the discussion of the integrated circuit 18 that a variety of specific voltages are required as applied to the various IC circuit components. A voltage regulator device 30 provides various pick-off voltages as determined a string of resistors.

The integrated circuit 18 includes temperature and voltage measuring or sensing devices which are adapted to provide "windows" during which the devices may operably and accurately measure or sense battery temperature and battery voltage in the manner described in applicant's aforementioned pending U.S. patent application. The "windows" are established by using a plurality of electronic comparators which are set up to measure an electrical characteristic representative of battery voltage or temperature.

Figure 2:
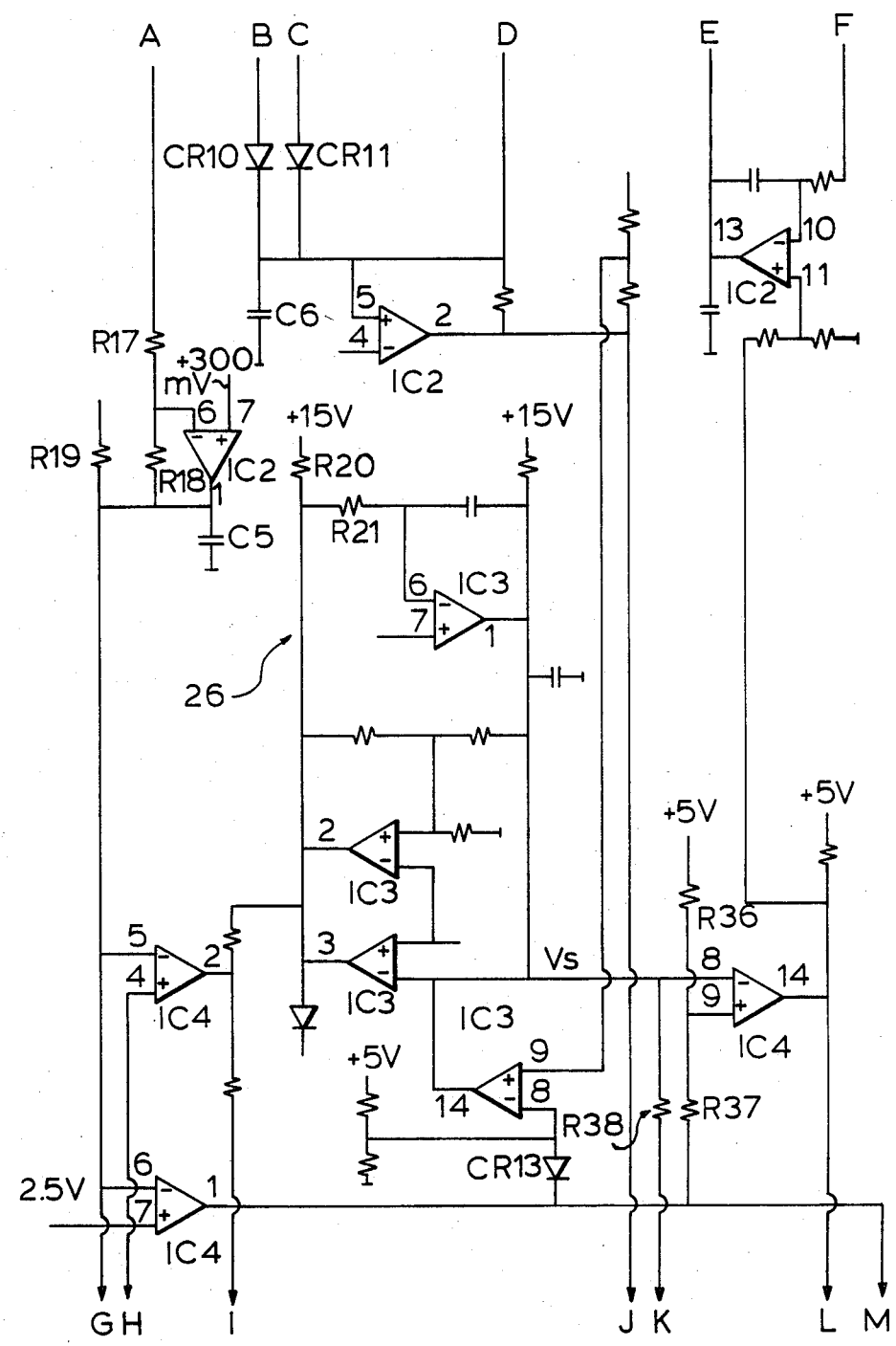
Figure 3:
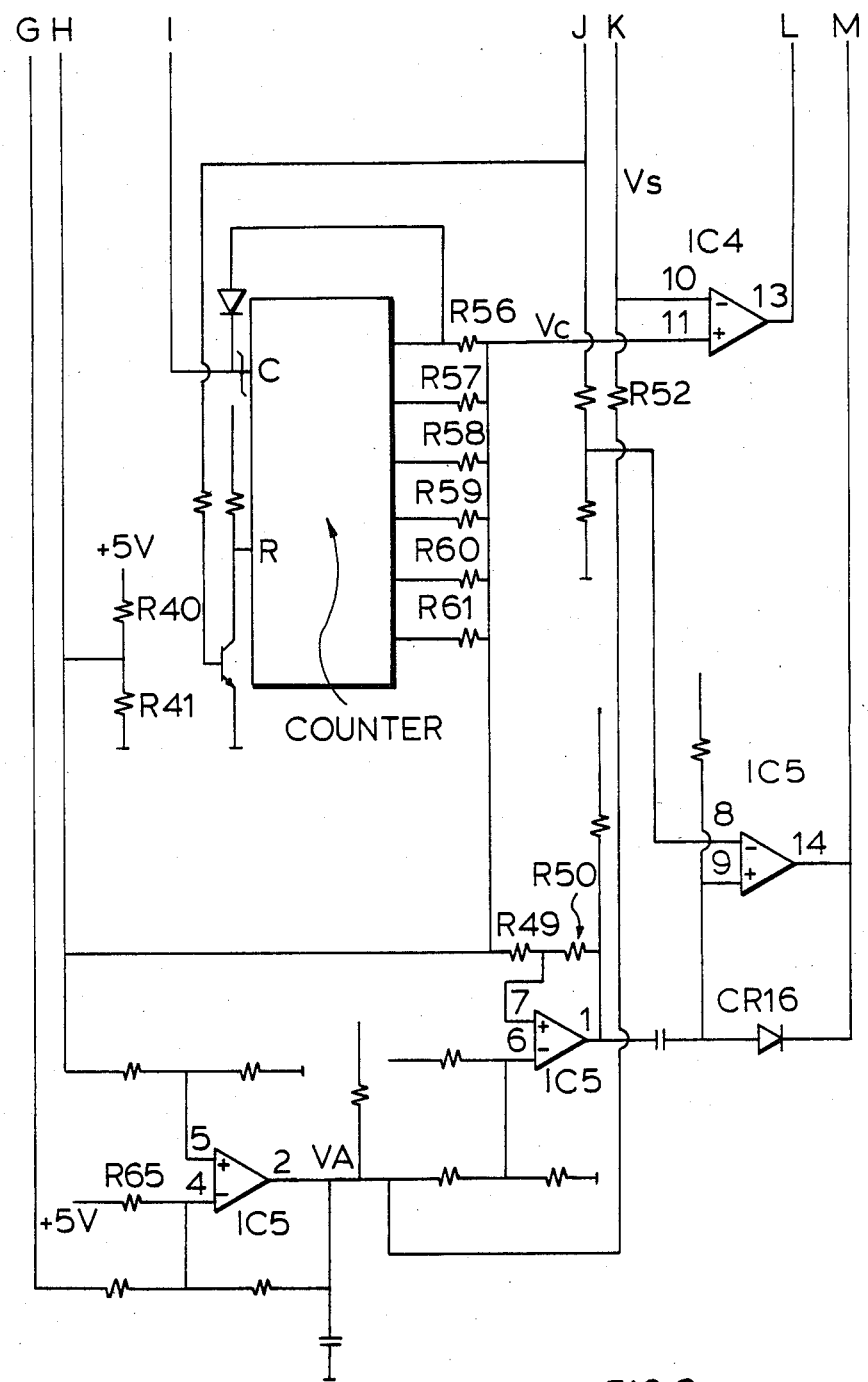

With reference to FIGS. 1, 2 and 3, a preferred embodiment of the circuitry is disclosed. Many of the components shown in the drawings have not been specifically described or discussed, because as will be appreciated by those skilled in the art, they are commonly used components in combination with the comparators for determining voltages, etc. in the operation of the circuitry. The important components in the operation of the circuitry are discussed herein to enable those skilled in the art to understand the operation of the control system.

The thermistor 24, resistor R16 and resistors R1 and R2 form a Wheatstone Bridge, when diodes D1 and D2 and the FET (field effect transistor) are not conducting. At low current levels for charging voltages less than the' instantaneous battery voltage effectively current only flows through the thermistor 24, through resistor R16 and resistors R1 and R2. The output of the Wheatstone Bridge is input to comparator IC1 at pin 4. IC1(4,5,2) is arranged to permit looking at the voltage across R16 up to the point where there is a possibility that current may start flowing through diodes D1 and D2 of the battery pack. This is arbitrarily considered to be at five volts supply voltage. This aspect is detected by R1 and R2 at five volts. The voltage across R16 at various temperatures, which in turn is fed to R3, is as follows.

TABLE I

| Temperature (°C.) | R Thermistor (Nominal ohms) | V at R16 (mV) |
| --- | --- | --- |
| 44 | 4257 | 525 |
| 42 | 4646 | 487 |
| 40 | 5034 | 447 |
| 33 | 6928 | 332 |
| 30 | 7895 | 291 |
| 27 | 9158 | 246 |
| 24 | 10553 | 216 |
| 5 | 27985 | 104 |

The output of IC1 (4) acts in establishing the window for IC1(7,6,1) to detect or sense the predetermined value for battery temperature during the first phase of charging. In accordance with this embodiment, the upper temperature limit is selected to be approximately 42° C. which corresponds to a voltage drop across R16 of approximately 450 mV. The maximum voltage at pin 7 of IC1 should not exceed approximately 470 mV. To arrange for IC1 output 1 to go high and commence charging of C6 through CR10, pin 6 voltage is adjusted to approximately 470 mV. Hence once the voltage at pin 7 achieves that level, output at IC1(1) goes high to commence charging of C6.

The true battery voltage is detected through IC1(9,8,14) just prior to appreciable current flowing into the battery which is taken to be at approximately 2.5 volts across R16 assuming that the FET is not conducting, which is equivalent to current flow of approximately 5 milliamps through R16. IC1(9,8,14) is set up as a difference amplifier with one percent resistors looking at the voltage applied to the output terminals 20 and 22. The voltage applied to the output terminals just before current commences flowing is set to be at a predetermined value as determined by comparator IC1 at pins 8 and 9. According to this embodiment, the upper level is set to be 8.7 volts taking into consideration the voltage drops across diodes D1 and D2, which would correspond to a battery voltage of 7.5 volts. When this is achieved, pin 14 goes high and commences charging C6 through CR11.

In this manner, the circuit 18 provides for a detection and trigger signal for either a predetermined value for battery temperature or battery voltage which results in a charging of capacitor C6. The charge on capacitor C6 is input to pin 5 of IC2(5,4,2). When the voltage on C6 exceeds the level set at pin 4, which may be approximately 2.5 volts, IC2(2) output goes high which enables the sawtooth generator. Otherwise the output (2) of IC2 is low which disables the sawtooth generator during the stage of fast charging of the battery pack 12. Once the selected value for temperature, as predetermined by comparator IC1(7,6,1) or the selected value for voltage as determined by IC1(9,8,14), charging current to the battery pack 12 is interrupted which is effected through the interconnected circuitry of FIGS. 2 and 3.

During the full charging cycle before either IC1(7,6,1,) or IC1(8,9,14) outputs go high, the charging current is determined by the FET whose gate is controlled by the output of IC2(10,11,13). During full charge of the battery, the output of IC2(13) is such to turn the FET on and provide a charging current, according to this embodiment, of approximately 1.2 amps. The full charge to the battery then consists of the rectified AC current which is in the form of the DC waveform as is determined by the rectifying diode arrangement of D3, D4, D5 and D6.

The output of IC2(13) is controlled by the outputs of IC4(10,11,13) and IC5(8,9,14). During the full charging phase of the battery charging cycle, the output of IC2(2) is low thereby establishing that the outputs of IC4 and IC5 are both high, and hence delivering a positive voltage to pin 11 of IC2 which is sufficient to provide a high output at pin 13 to provide full charge on the batteries 12. However, when the output of IC2(2) goes high due to either a sensing of battery temperature or battery voltage at the predetermined values, the sawtooth generator generally designated 26 is enabled to provide an output at VS which is applied to pin 10 of IC4(13). This causes the output IC4(13) to go low which overrides the high output of IC4(14) causing the output of IC2(13) to go low which opens the FET. During this phase of the charging cycle, the charging current is reduced to a minimum or zero current as applied to the battery to allow the battery to cool. It is appreciated for a variety of reasons, a minimal current may be applied to the battery during the cooling off phase where the objective is to achieve battery cooling as quickly as possible to the predetermined lower temperature. It is also appreciated that many characteristics of a battery may be sensed in determining when the first phase of battery charging should be stopped to allow the battery to cool down. For example, a combination of battery voltage and temperature could be sensed and compared where related values for battery temperature and voltage could indicate that full charging is to be stopped. Other characteristics, such as values for rate of change in battery charge, could also be sensed. The consideration is that the first phase of battery charging be stopped at least before any damage is done to the battery, hence a predetermined value for an upper battery temperature or voltage can indicate this.

The extent to which the battery cools is determined by the output of IC2(1) on pin 5 of IC4. IC2(7,6,1) is an "inverting peak detector". The maximum positive voltage at input of pin 6 to IC 2 will produce a correspondingly lower output, both voltages effectively swinging around the voltage applied to IC2(7) with the gain set by R18/(R17+R3). With appropriate values chosen for these components, the following relationships apply with respect to battery temperature and the output of IC2(1).

TABLE II

| Temperature (°C.) | IC2(1) Output |
|---|---|
| 40 | 0 |
| 33 | 0.009 |
| 30 | 0.382 |
| 27 | 0.764 |
| 24 | 1.064 |
| 5 | 2.500 |
| No battery | 3.000 |

The temperature responsive voltage, which is the output of IC2(1), is applied to pin 5 of IC4. IC4(4,5,2) compares the temperature responsive voltage of IC2(1) applied at pin 5 to the biased voltage output of the counter applied to pin 4. To ensure that a second phase of charging of the battery is resumed after a cool-down period, the biased output of the counter before the first count of the counter is adjusted to provide a potential of 0.382 mV which is the corresponding output of IC2(1) for a battery temperature of 30° C. As the temperature of the battery decreases during the cool-down period, the output of IC2(1) is increasing in accordance with the values of Table II. As the voltage on pin 5 of IC4 continues to increase due to battery cooling, eventually the voltage at pin 5 will match the counter output voltage on pin 4 of IC4. Up until this time, the output of IC4(2) is zero which has not permitted the counter to count up because all clock pulses from IC3(2) have been not delivered to input C of the counter. However, upon a match at inputs 4,5 of IC4, IC4(2) goes high to permit delivery of a single clock pulse per sawtooth period via IC3(2) which may be thirty seconds. As long as IC2(2) continues to be high, a clock pulse is then delivered to the input C of the counter. The output of the counter, as it counts in binary fashion down through the resistance values for R56 through R61, produces an increasingly larger voltage at pin 4 of IC4. Hence, for each clock pulse applied to the counter pin C, the output of the counter increases. IC4(10,11,13) thereby delivers progressively increasing pulse widths as the counter is marched up, while the battery temperature continues to decrease. This causes the charging current to increase with reducing battery temperature where, according to this embodiment, the increase in charging current is accomplished in steps by selecting increasing magnitudes of charging current in response to each counter pulse. The biased output of the counter now tracks with continued increasing voltage on pin 5 of IC4 as the battery temperature continues to drop. This is due to the biased output VC of the counter as applied to pin 11 of IC4 exceeding for a greater period of time the output VS of the sawtooth generator applied to pin 10 of IC4. The longer the output IC4(13) remains high, the longer the FET is closed in applying an interval of full charging current to the battery.

Eventually the battery temperature will level out and may commence to rise again due to the increased current applied to the battery. As the battery approaches full charge, it rejects more and more of the charging current which commences increasing battery temperature again. At this point in time the output of IC5(2) takes over to provide for a decrease in charging current. IC5(5,4,2) is a high gain amplifier which compares the difference between the output of IC2(1) as applied to pin 4 and the biased output of the counter as applied to pin 5. The output of IC5(2) is Va which is normally high and goes low when IC2(1) and the biased output of counter Vc come into balance. At this point in time, cooling of the battery has levelled off and temperature rise of the battery commences. As a result, the output IC2(1) begins to fall off, thereby increasing the output at IC5(2). This second rise in the output Va is used to raise the sawtooth via the output of IC4(13). At each sensed finite increment of the battery temperature commencing to increase, the output of IC5(2) Va is increased. The output of Va via resistor 52 in turn reduces the output of IC4(13) by raising the sawtooth voltage, that is the potential of Vs at pin 10. Hence the extent of the interval during which the FET is on is reduced. According to this embodiment, the counter period may be approximately 30 seconds. Depending upon the value of Va, the extent to which the output of IC4(13) is high, determines the length of time that the output of IC2(13) is high to control the FET. As Va increases, the extent of the interval becomes less and less, due to Va+Vs exceeding Vc for a longer period and thereby reducing the pulse width of charging current applied to the battery pack. The parameters of operation for IC5(5,4,2) may be selected such that its output in combination with the output Vs of the sawtooth generator is such to commence reducing the pulse width of charging current, upon the battery commencing to increase in temperature to an extent less than 1°. It is appreciated that in reducing the extent of the pulse interval once battery temperature commences to increase, battery temperature can be essentially held constant at that point when cooling of the battery ceases. It is appreciated that such control does depend on the condition of the battery and the temperature at which charging had been resumed after a predetermined battery cool down phase. If precise control is not exercised, it is appreciated that battery temperature may be allowed to increase slightly, but is preferably kept below the battery temperature at which charging had been resumed Furthermore, it is appreciated that the circuit may function in a manner to continue to reduce or decrease charging current by reducing the pulse width of the charging current each time that it is sensed that the battery temperature is commencing to increase. In this manner, an essentially constant battery temperature is maintained once the battery has ceased cooling down during the second stage of battery charging.

As reduction in current continues on the battery pack, eventually it is desirable to switch to a final stage of trickle charging because once current has reduced to a predetermined minimum level, it is apparent that the battery is not accepting any more charging current at a temperature which may be very close to ambient temperature.

IC5(7,6,1,) operates on inputs Va at pin 6 and Vc at pin 7 to determine whether the pulse charging current is above or below an average value of 150 mA. R49 and R50 provide the snap action only and do not enter into the calculation in making this determination. The relationship between Va and Vc is per the following Table at 150 mA as determined by the voltage drops over the resistive network.

TABLE III

| Va | Vc |
|---|---|
| 0 | .40 |
| 1 | .53 |
| 2 | .66 |
| 3 | .79 |
| 4 | .91 |
| 5 | 1.05 |

For any of these relationships, IC5(1) falls when the charging current is reduced below 150 mA. IC5(8,9,14) latches low when reduction in the current to 150 mA is sensed by IC5 with corresponding output. It latches low via CR16 and is not influenced by the upward transition of IC5(1). The output of IC5(14) is guaranteed to be in an initial "up" state by the minimum diode drop above ground at IC5(9) dominating over the zero volts at IC5(8) set when the voltage/temperature latch IC2(5,4,2) is low. The output of IC5(14) is applied to pin 9 of IC4(8,9,14) hence giving an output at 14 which overrides IC4(11,10,13) since pin 13 is otherwise asking for a larger current from the level of the sawtooth generator. When IC5(14) latches low, it sets 0.354 volts at IC4(9) which is the proper value for establishing a minimal desired pulse width of charging current, according to this embodiment, of 50 mA trickle charging current on the battery 12.

Hence IC4(8,9,14) serves two purposes. It establishes the final trickle charge by the ratio of R36 and R37 when IC5(14) is low. Secondly, the IC4(8,9,14) limits the "cold battery" current to the same trickle charge level by IC4(1). IC4(6,7,1) compares the output of IC2(1) on pin 6 to preset voltage of 2.5 volts. According to Table II, a battery temperature of 5° C., corresponds to an output of IC2(1) of 2.5 volts. Hence if a cold battery is placed in the charger, the output of IC4(1) is low which ensures a trickle charge applied to the cold battery until the temperature approaches ambient and IC2(1) falls below 2.5 volts. In order for the cold battery current to be provided along with a trickle charge, the sawtooth generator must continue to work even though IC2(2) is still low. This is accomplished by diode CR13 on pin 8 of IC3(8,9,14).

Related to the operation of the FET, IC1(11,10,13) acts to prevent the FET from conducting. Via CR9 and CR8 it permits IC1(9,8,14) to operate until the desired 5 mA current is flowing through R16. Of course, at low temperature (high resistance thermistor) this will not happen until the current is actually flowing into the battery. IC2(9,8,14) acts to sense if a battery is connected. An average voltage of less than 300 mV across R16, which cannot happen with a battery present, will cause the high charge cut off IC2(5,4,2) to be reset.

Accordingly, this approach in charging a battery by use of pulse charging during the final phase of battery charging gives full capacity charge on the battery in providing for a charge at battery temperatures close to ambient. Accordingly, for nickel cadmium battery of high "C" rating, the battery is allowed to cool from the predetermined temperature of approximately 40° to a predetermined lower temperature of approximately 30° at which time pulse charging commences at a minimum level and is increased gradually until battery temperature ceases to drop. As battery temperature commences to rise again, due to the battery rejecting a larger portion of charging current and indicating that it is getting very close to full charge at the reduced temperature, the charging current is backed off until a predetermined minimum current is sensed. In this manner, a rapid full charging of the battery pack can be achieved while reducing battery damage during the full charging process by minimizing heating thereof. As a result, the battery pack receives only the maximum charging current it can handle without overheating during the final phase of charging. The charging of the battery pack will not terminate until the current has been reduced in this manner, according to this embodiment, to approximately 150 mA. This system is particularly useful in charging F type nickel cadmium batteries having 7 amp hour rating which can be charged at a full charge rate of 1.25 amps.

The control system, according to this invention, for the charging of rechargeable batteries therefore provides a selection of effective magnitudes of charging current which prevents subsequent significant increase of battery pack temperature during the second stage of battery charging. This can be accomplished in a variety of ways to realize this advantage of the invention. By use of the circuitry of the preferred embodiment, a selection of various effective magnitudes of charging current is made where based on battery temperature, once the second phase of charging commences, increasing magnitudes of charging current are applied to the battery until the battery ceases cooling down and commences to warm up. From this point on, decreasing charging current is made to occur to prevent any further increase in battery temperature.

In using the control system, according to this invention for battery charging, where battery temperature or voltage is sensed to determine the end of the first phase of battery charging, for a consistent battery pack design for example using nickel-cadmium batteries, an essentially reproducible routine commences to appear based on time in the charging of the battery. Therefore, the principles of this invention may be accomplished not only through measuring the battery temperature or voltage, but also based on time. For example, battery temperature or voltage may be measured and the first phase of battery charging and interrupted once battery temperature or voltage has reached a predetermined maximum. Knowing the cool-down characteristics of the battery based on data collected from prior charging cycles of the battery and knowing the ambient temperature, the cool-down period for the battery can be related to time. Furthermore, the second phase of charging may also be based on time where data collected from prior battery charging cycles determines the selection and timing of effective magnitudes of charging current applied to the battery. The expiry of some predetermined period of time in the second phase of charging the system can be automatically switched to trickle charging.

It is appreciated that the control system, according to this invention, may rely on sensed battery temperature right through the second phase of battery charging. However, after a predetermined interval of charging the system may be automatically switched to trickle charging regardless of whether or not the battery is at its fullest charge potential.

Accordingly, an aspect of this invention provides a control system for battery charging where battery temperature may produce a signal at one level only which corresponds to the end of the first charging period. When this temperature is reached, current is reduced so as to permit a cool-down period for the battery. This cool-down period may be controlled via a timing device which is set for a time during which the battery will have been known to have cooled down to a suitable temperature knowning the ambient temperature. Following this time, at least one effective magnitude of charging current may be selected which will charge the battery to its fullest extent without significantly increasing the temperature of the battery during the second phase of charging. Trickle charging of the battery is commenced upon expiry of a predetermined period for the second phase of battery charging.

Although preferred embodiments of the invention have been described herein in detail, it will be understood by those skilled in the art that variations may be made thereto without departing from the spirit of the invention or the scope of the appended claims. In particular, simpler circuitry than that described when the electrical safety imparted by the inclusion of diodes in the battery pack, to prevent reverse flow through the charging terminals, is not required.

We claim:

1. A method of charging a battery pack made up of one or more rechargeable cells comprising applying a charging current to said battery pack, reducing charging current when a predetermined value for a battery characteristic which includes temperature, or voltage or combination thereof is sensed, to permit said battery pack to cool for a period to a lower temperature, resuming charging said battery pack when said battery pack has cooled during said period to said lower temperature and selecting effective magnitude of charging current to prevent subsequent significant increase of battery pack temperature beyond a predetermined increment above said lower temperature.

2. A method of claim 1, wherein said predetermined increment is less than 5° C.

3. A method of claim 2, wherein said predetermined increment is less than 1° C.

4. A method of claim 1, wherein various effective magnitudes of charging current are selected.

5. A method of claim 4, wherein said effective magnitudes of charging current are selected sequentially in increasing magnitude of charging current and then decreasing magnitude of charging current.

6. A method of claim 5, wherein said selection of increasing and decreasing magnitudes of charging current is sequentially based on predetermined time intervals.

7. A method of claim 5, wherein said battery pack temperature is monitored while selecting effective magnitudes of charging current, continuing to charge said battery pack at selected sequentially increasing magnitudes of charging current until sensed battery pack temperature has increased an amount equivalent to or less than said predetermined increment, then sequentially selecting decreasing magnitudes of charging current.

8. A method of claim 7, wherein said predetermined increment is less than 1° C. whereby a maximum battery pack charge is achieved for said battery pack at a temperature essentially the same as said lower temperature.

9. A method of claim 7, wherein charging of said battery pack is resumed for a second stage of battery charging when it has cooled to said lower battery temperature, where during said second stage of battery pack charging:
  (i) increasing magnitude of charging current applied to said battery pack upon sensing a finite decrease in battery temperature as said battery continues to cool;
  (ii) decreasing charging current magnitude applied to said battery pack upon sensing battery temperature at least commencing to increase as said battery pack begins to warm up again.

10. A method of claim 9, wherein said battery pack is trickle charged during a final stage of battery pack charging when said battery pack is charged to essentially full charge.

11. A method of claim 10, wherein trickle charging of said battery is commenced in response to expiry of a predetermined time interval for said second stage of battery charging.

12. A method of claim 10, wherein charging current as applied to said battery is sensed, then trickle charging said battery pack upon sensing a decrease in charging current to a predetermined minimum charging current applied to said battery pack.

13. A method of claim 7, wherein said rechargeable cells are nickel-cadmium cells.

14. A method of claim 13, wherein said battery pack comprises a case in which said nickel-cadmium cells are sealed, said case having poor heat dissipation characteristics, said method comprising sensing temperature of said cells in said case.

15. A method of claim 13, wherein said lower temperature is selected from the range of 25° C. to 35° C.

16. A method of claim 15, wherein said lower temperature is in the range of 30° to 33° C.

17. A method of claim 15, wherein said lower temperature is less than or equal to 5° C. above anticipated ambient temperature during battery charging.

18. A method of claim 17, wherein charging of said battery pack is resumed upon sensing battery pack temperature has cooled during said period to said lower temperature as predetermined.

19. An electronic battery charger for charging a rechargeable battery, said charger comprising means for sensing a battery characteristic which includes temperature, or voltage, or a combination thereof, during a battery charging cycle, means for charging a battery by applying a charging current to such battery, means for controlling charging current applied by said charging means, said control means reducing charging current in response to said sensing means sensing a predetermined value for the sensed battery characteristic during a charging cycle to permit battery cooling for a period to a lower battery temperature, said control means activating said charging means for a second state of battery charging when such battery has cooled during said period; said control means selecting effective magnitude of charging current to prevent subsequent significant increase of battery temperature beyond a predetermined increment above said lower temperature during said second stage of battery charging.

20. An electronic battery charger of claim 19, wherein said predetermined increment is less than 5° C.

21. An electronic battery charger of claim 20, wherein said predetermined increment is less than 1° C.

22. An electronic battery charger of claim 19, wherein said control means selects various effective magnitudes of charging current.

23. An electronic battery charger of claim 22, wherein said control means selects sequentially increasing orders of magnitude of charging current and then decreasing orders of magnitude of charging current.

24. An alectronic battery charger of claim 23, wherein said control means selects increasing and decreasing orders of magnitude of charging current in a sequential manner based on predetermined time intervals.

25. An electronic battery charger of claim 23, wherein said control means during said second stage of battery charging sequentially selects increasing magnitudes of charging current, said sensing means sensing battery temperature during said second stage of charging, said control means sequentially selecting decreasing magnitudes of charging current in response to said sensing means sensing a battery temperature increase equivalent to or less than said predetermined increment.

26. An electronic battery charger of claim 24, wherein said predetermined increment is 1° C.

27. An electronic battery charger of claim 23, wherein said control means increases said charging current applied to a battery in response to said sensing means sensing a further finite decrease in battery temperature during said second stage of said battery charging cycle, said control means decreasing said charging current applied to a battery in response to at least said sensing means sensing battery temperature commencing to increase after a battery being charged in said second stage has ceased cooling down.

28. An electronic battery charger of claim 27, wherein said control means decreases said charging current in response to said sensing means sensing a finite increase in battery temperature during said second stage.

29. An electronic battery charger of claim 27, wherein said control means maintains battery temperature essentially constant after a battery being charged in said second stage has ceased cooling down.

30. An electronic battery charger of claim 27, wherein control means increases or decreases charging current in predetermined increments in response to said temperature sensing means sensing a corresponding finite incremental decrease or increase in sensed battery temperature.

31. An electronic battery charger of claim 28, wherein said charging means when actuated by said control means applies a full charging current equivalent to a charging current applied during a fast charging stage of battery charging, said control means activating said charging means for applying said full charging current during intervals of a predetermined period of time, said control means determining an extent for each interval of said period in response to said sensing means sensing an increase or decrease in battery temperature to select thereby said effective magnitudes of charging current applied to a battery in accordance with sensed battery temperature to preclude heating a battery above said lower battery temperature.

32. An electronic battery charger of claim 31, wherein said charging means applies a rectified alternating current to a battery, said control means in determining an extent for each of said intervals of full charging current providing spaced-apart pulses of a series of peaks of rectified alternating charging current.

33. An electronic battery charger of claim 31, wherein said control means incrementally increase or decrease said extent for each interval of said period in response to said temperature sensing means sensing said finite increase or decrease in battery temperature.

34. An electronic battery charger of claim 31 for charging nickel-cadmium cells contained in a sealed battery case, said charging means applying a full charging current of at least 0.1° C. rating for such nickel-cadmium battery to be charged.

35. An electronic battery charger of claim 34 for charging nickel-cadmium batteries having a C rating of at least 7 amp hours, said full charging current being 1.2 amperes.

36. An electronic battery charger of claim 27, wherein said control means establishes a trickle charging current applied by said charging means when said battery has reached essentially full charge.

37. An electronic battery charger of claim 36, wherein said control means establishes a trickle charging current in response to expiry of a predetermined time interval for said second stage of battery charging.

38. An electronic battery charger of claim 36, wherein means is provided for sensing charging current, said control means establishes said trickle charging current in response to said current sensing means sensing during said final stage a current decrease to a predetermined minimum charging current.

39. An electronic battery charger of claim 31, wherein said control means establishes a minimum extent for said interval of said period when said current sensing means senses said predetermined minimum charging current, said minimum extent corresponding to a trickle charging current applied to said battery.

40. An electronic battery charger of claim 39, wherein said trickle charging current is approximately 50 milli-amperes.

* * * * *